(12) United States Patent
Masuji

(10) Patent No.: US 8,475,032 B2
(45) Date of Patent: Jul. 2, 2013

(54) BACKLIGHT DEVICE, IMAGE DISPLAY DEVICE, AND METHOD OF ASSEMBLING BACKLIGHT DEVICE

(75) Inventor: Shigehiro Masuji, Tokyo-to (JP)

(73) Assignee: JVC Kenwood Corporation (JP)

( * ) Notice: Subject to any disclaimer, the term of this patent is extended or adjusted under 35 U.S.C. 154(b) by 0 days.

(21) Appl. No.: 13/352,665

(22) Filed: Jan. 18, 2012

(65) Prior Publication Data
US 2012/0182763 A1  Jul. 19, 2012

(30) Foreign Application Priority Data

Jan. 18, 2011  (JP) ................................. 2011-007690

(51) Int. Cl.
*F21V 7/04* (2006.01)
(52) U.S. Cl.
USPC ........... 362/613; 362/600; 362/612; 362/615; 362/617; 362/628; 362/23.1; 362/23.17
(58) Field of Classification Search
USPC ................ 362/600, 612, 613, 615, 617, 628, 362/23.1, 23.17
See application file for complete search history.

(56) References Cited

U.S. PATENT DOCUMENTS

| | | | |
|---|---|---|---|
| 2009/0168456 A1* | 7/2009 | Park et al. | 362/613 |
| 2010/0245704 A1* | 9/2010 | Kim et al. | 349/58 |
| 2011/0273905 A1* | 11/2011 | Lin et al. | 362/607 |

FOREIGN PATENT DOCUMENTS

| | | |
|---|---|---|
| JP | 2004-079488 | 3/2004 |
| JP | 2010281999 | 12/2010 |
| KR | 100966874 | 6/2010 |

* cited by examiner

*Primary Examiner* — Stephen F Husar
*Assistant Examiner* — Meghan Dunwiddie
(74) *Attorney, Agent, or Firm* — Cantor Colburn LLP (57) ABSTRACT

A backlight device, where expense reduction is promoted by standardizing lengths of LED boards to one type. The backlight device includes: a light guide plate; and LED boards which are arranged facing end surfaces of side surface portions of the light guide plate and on which LEDs introducing light to the light guide plate are mounted, wherein lengths of long sides of the LED boards arranged on long sides facing end surfaces in a long side direction of the light guide plate and lengths of long sides of the LED boards arranged on short sides facing end surfaces in a short side direction of the light guide plate are all the same.

7 Claims, 10 Drawing Sheets

FIG. 8

BACKLIGHT DEVICE, IMAGE DISPLAY DEVICE, AND METHOD OF ASSEMBLING BACKLIGHT DEVICE

CROSS-REFERENCE TO RELATED PATENT APPLICATIONS

This application claims the benefit of Japanese Patent Application No. 2011-007690, filed on Jan. 18, 2011, in the Japan Patent Office, the disclosure of which is incorporated herein in its entirety by reference.

BACKGROUND OF THE INVENTION

1. Field of the Invention

The present invention relates to a backlight device, an image display device including the backlight device, and a method of assembling a backlight device, and more particularly, to a backlight device which irradiates light from a rear surface of a display panel by introducing light through a side surface (end surface) of a light guide plate by using a plurality of point light sources, such as light emitting diodes (LEDs), an image display device, and a method of assembling a backlight device.

2. Description of the Related Art

Recently, accompanied by an increase in the screen size of an image display device (for example, a display device or a television set) which displays an image by using a display module, such as a liquid crystal panel, thinning or weight lightening is required to decrease a thickness of a body of the image display device as much as possible. For thinning or weight lightening of the body of the image display device, a display module or the inner part of a case body occupying most of volume or weight inside the body of the image display device may be thinned or weight-lightened. Also, a back light device is required when a liquid crystal panel is used in the display module, and thus in order to thin the display module, it is important to thin the backlight device.

In order to thin the backlight device, various backlight systems using an edge light method of disposing a LED light source on an end surface of a light guide plate are being suggested. As such, by disposing the LED light source on the end surface of the light guide plate, the backlight device can be thinned.

A backlight system of such an edge light method using an LED as a light source is disclosed, for example, in Patent Document 1.

(Patent Document 1) Japanese Laid-Open Patent Publication No. 2004-79488 (FIGS. 4 through 6)

SUMMARY OF THE INVENTION

The present invention provides a backlight device, an image display device, and a method of assembling a backlight device in a backlight system of an edge light method using a LED as a light source, in which cost reduction may be promoted since lengths of LED boards can be standardized to one or two types, thinning or edge-narrowing of a backlight or image display device may be realized even if a heat radiation countermeasure is performed since LEDs can be effectively arranged on an end surface of a light guide plate, and a lifetime of the backlight may be increased since a change of an LED light source with the passage of time is uniformized in overall.

According to an aspect of the present invention, there is provided a backlight device including: a light guide plate; and LED boards which are arranged facing end surfaces of side surface portions of the light guide plate and on which LEDs introducing light to the light guide plate are mounted, wherein lengths of long sides of the LED boards arranged on long sides facing end surfaces in a long side direction of the light guide plate are the same, and lengths of long sides of the LED boards arranged on short sides facing end surfaces in a short side direction of the light guide plate are the same.

According to another aspect of the present invention, there is provided a backlight device including: a light guide plate; and LED boards which are arranged facing end surfaces of side surface portions of the light guide plate and on which LEDs introducing light to the light guide plate are mounted, wherein lengths of long sides of the LED boards arranged on long sides facing end surfaces in a long side direction of the light guide plate and lengths of long sides of the LED boards arranged on short sides facing end surfaces in a short side direction of the light guide plate are all the same.

According to another aspect of the present invention, there is provided an image display device including: the backlight device above; and a display module having a display surface which displays an image.

According to another aspect of the present invention, there is provided a method of assembling a backlight device including a light guide plate and LED boards, which are arranged facing end surfaces of side surface portions of the light guide plate and on which LEDs introducing light to the light guide plate are mounted, wherein lengths of long sides of the LED boards arranged on long sides facing end surfaces in a long side direction of the light guide plate are the same, and lengths of long sides of the LED boards arranged on short sides facing end surfaces in a short side direction of the light guide plate are the same, and the LED boards standardized according to each side of the light guide plates are respectively arranged along the end surfaces of four (4) sides of the light guide plate, the standardized LED boards are alternately arranged to be misaligned on the long sides facing the end surfaces in the long side direction of the light guide plate such as not to overlap with respect to an axis of the long side direction of the light guide plate, and the standardized LED boards are alternately arranged to be misaligned on the short sides facing the end surfaces in the short side direction of the light guide plate such as not to overlap with respect to an axis of the short side direction of the light guide plate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to FIGS. 1 through 10.

Figure 1:
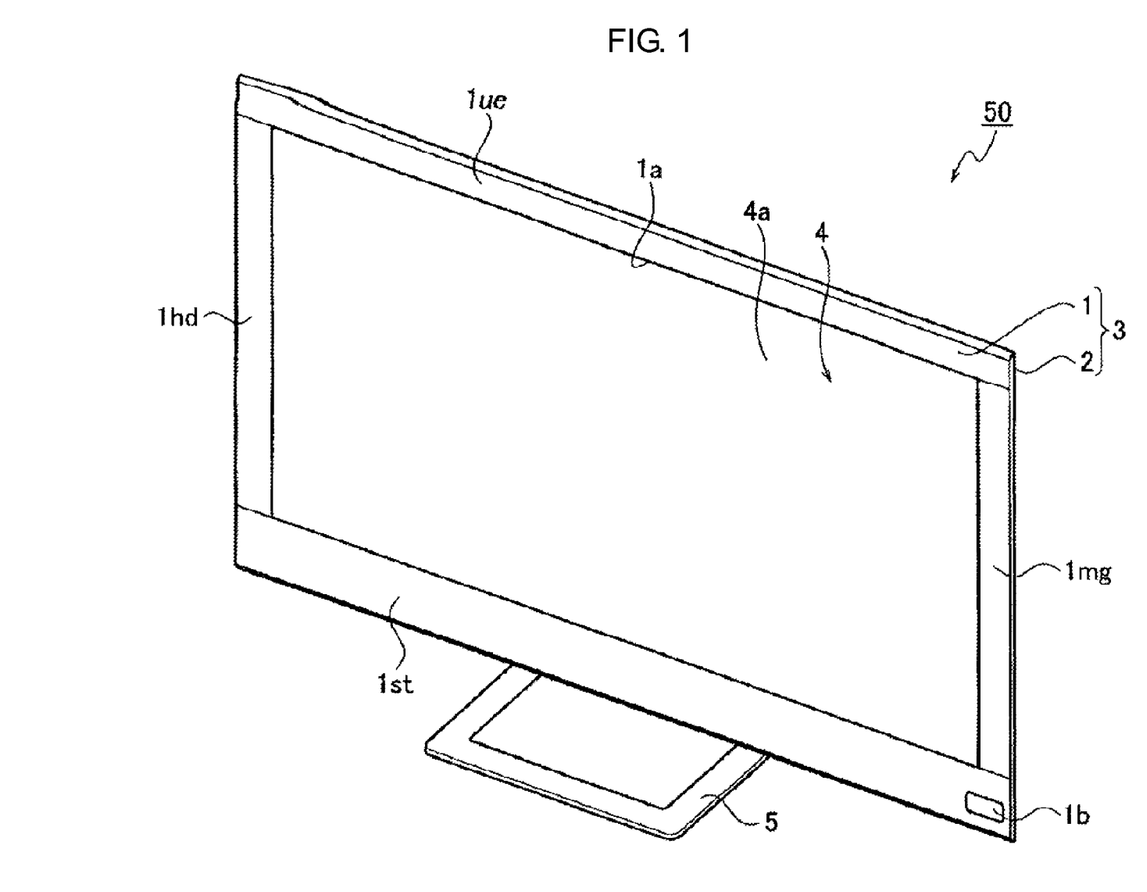
FIG. 1 is a perspective view of an overall configuration of an image display device according to an embodiment of the present invention.

FIG. 1 is a perspective view of an overall configuration of an image display device 50 according to an embodiment of the present invention, which is viewed from a front upper right side of the image display device 50. Here, a side where a display screen is seen is referred to as the front.

The image display device 50 according to the present embodiment is a monitor which displays an externally inputted image signal. A screen size is assumed to be a large size of at least 30 inch type, and present embodiment describes about a case of 42 inch type. Also, a liquid crystal panel is used as a display panel.

In FIG. 1, the image display device 50 includes a case body 3 where a front case body 1 having a frame shape and a rear case body 2 are combined to each other.

The case body 3 accommodates a liquid crystal panel 4, and a display surface 4a constituting an image display unit of the liquid crystal panel 4 is externally exposed through an opening 1a having a rectangular shape formed in the front case body 1.

Also, the case body 3 is supported by a stand 5 adhered to a rear surface (inside of the drawing sheet of FIG. 1) of the case body 3, and the image display device 50 is provided on a floor or the like. Alternatively, the stand 5 may be removed and a hanging tool may be adhered to the case body 3 so that only the case body 3 may hang on a ceiling or be mounted on a wall.

The front case body 1 has a rectangular frame shape by a top frame 1ue and a bottom frame 1st, having portions extending to the right end from the left end thereof, and a left frame 1hd and a right frame 1mg, having portions connected the top and bottom frames 1ue and 1st in an up-and-down direction at the right and left ends thereof. A remote control light receiving window unit 1b is formed at the right of the bottom frame 1st.

Although not shown, an LED-DRV board on which a drive circuit for driving an LED light source is mounted, or a timing controller board for controlling display of the liquid crystal panel 4, is provided on a rear bottom surface of the rear case body 2 of the image display device 50. In addition, a board on which a circuit for signal processing or the like of the image display device 50 is mounted, or a power supply unit (not shown) is provided on the image display device 50, wherein various types of boards or the power supply unit is entirely covered by a board cover.

Figure 2:
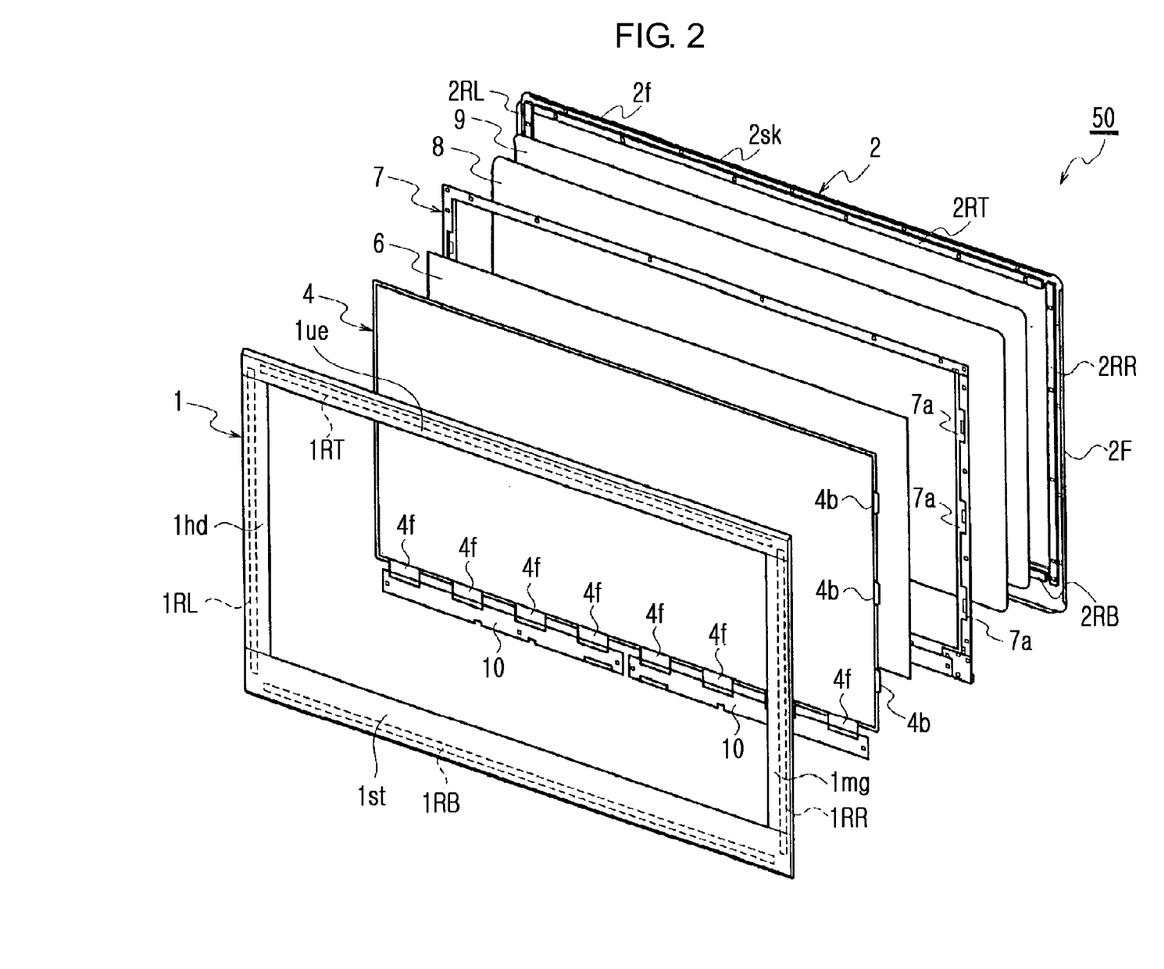
FIG. 2 is an exploded perspective view of the image display device.

FIG. 2 is an exploded view of the image display device 50.

The image display device 50 includes, in an order from the front, the front case body 1, the liquid crystal panel 4, an optical sheet unit 6, a panel chassis 7, a light guide plate 8, a reflection sheet 9, and the rear case body 2.

In FIG. 2, components behind the liquid crystal panel 4, i.e., components from the optical sheet unit 6 to the rear case body 2 constitute a backlight device.

In the present embodiment, in order to thin the image display device 50, the front and rear case bodies 1 and 2 are used as case bodies for both the image display device 50 and the backlight device, but the present invention is not limited thereto, and the image display device 50 and the backlight device may be configured by separate case bodies.

The front case body 1 has a frame shape in which the top, bottom, left, and right frames 1ue, 1st, 1hd, and 1mg are combined to each other, and ribs 1RT, 1RB, 1RL, and 1RR are provided respectively inside the top, bottom, left, and right frames 1ue, 1st, 1hd, and 1mg, thereby strengthening rigidity of the front case body 1 while efficiently radiating heat generated inside the case body 3 to the outside of the image display device 50.

A pair of LCD-DRV boards 10 is connected to a bottom side end of the liquid crystal panel 4 constituting an image display panel, by using flexible boards 4f and includes a circuit for driving the liquid crystal panel 4 thereon, Three (3) protruding pieces 4b having a film shape protrude from each of right and left sides of the liquid crystal panel 4.

The panel chassis 7 is formed on a frame by injection molding resin, and a concave portion 7a is formed at a location corresponding to the protruding piece 4b such as not to interfere with the protruding piece 4b.

The rear case body 2 includes a base board 2sk, and a top rib body 2RT, a bottom rib body 2RB, a left rib body 2RL, and a right rib body 2RR, in which four rib bodies are adhered to the base board 2sk. By adhering the four rib bodies 2RT, 2RB, 2RL, and 2RR, rigidity of the rear case body 2 is strengthened, and also heat generated in the case body 3 is efficiently radiated to the outside of the image display device 50.

The base board 2sk may be formed by, for example, performing a process, such as pressing, on an aluminum plate having a thickness of 1.0 mm. An end of each side is bent toward front side to form a flange unit 2f.

Figure 3:
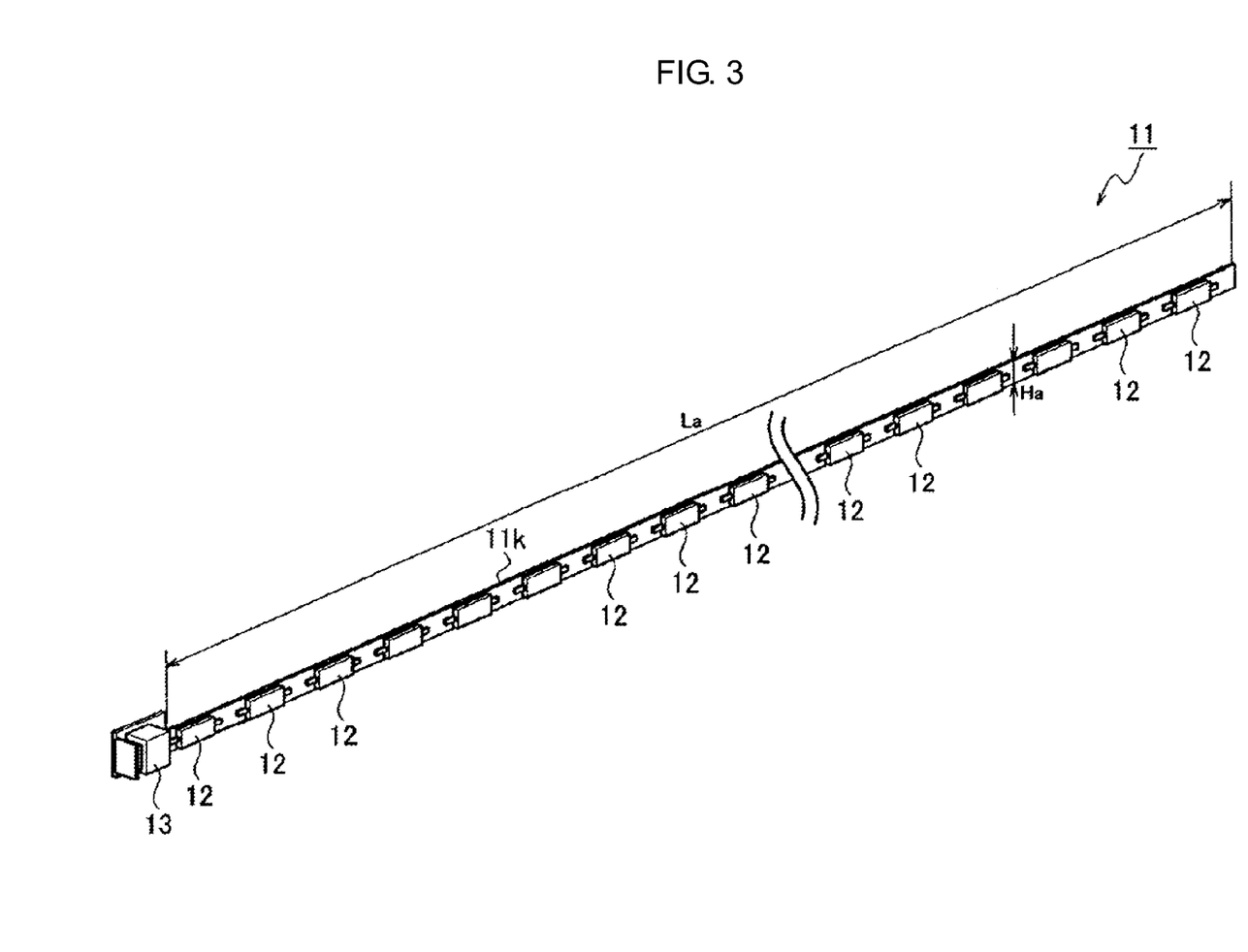
FIG. 3 is a perspective view of a LED board used in the image display device.

An LED board 11 shown in FIG. 3 is adhered to facing surfaces (sides farther from the adjacent flange unit 2f) of the top, bottom, left and right rib bodies 2RT, 2RB, 2RL, and 2RR.

In the LED board 11, a plurality of LEDs 12, which are light sources, are mounted on a base board 11k. Each LED 12 is a white LED.

Figure 5:
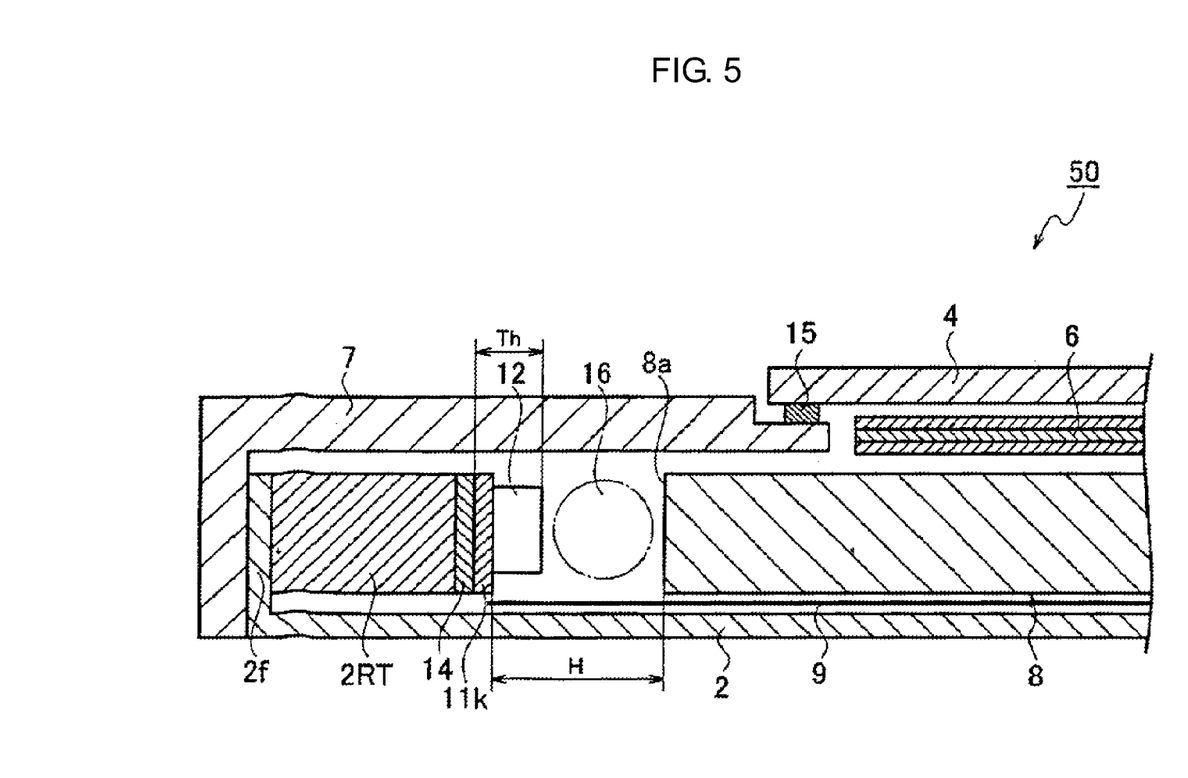
FIG. 5 is a cross-sectional view of essential parts of the image display device.

As shown in FIG. 5 described later, in the image display device 50 according to the present embodiment, a liquid crystal panel emits light by introducing light from the LED 12 to an end surface 8a of a side surface portion of the light guide plate 8.

The LED board 11 is provided on total four sides at locations corresponding to the end surfaces 8a on the top, bottom, right, and left sides of the light guide plate 8, and introduces light to the inside of the light guide plate 8 from each of the four sides.

As described later, the LED boards 11 are not arranged to surround all top, bottom, left, and right end surfaces 8a of the light guide plate 8, but are alternately arranged to be misaligned at facing long sides or short sides.

In detail, as shown in FIG. 3, the base board 11k has a thin and long plate shape, where a long side La of the LED board 11 is shorter than a long side of the end surface 8a of the light guide plate 8, and a short side Ha of the LED board 11 corresponds to a width of a surface of a rib body, which faces the light guide plate 8.

The plurality of LEDs 12 are arranged at equal pitches to be aligned in a long side direction of the base board 11k. One anode and one cathode are provided in each LED 12, and the LED 12 is lighted on as a voltage is applied between the anode and the cathode. Also, a connector 13 to be connected to the LED-DRV board is mounted on one end of the base board 11*k*.

Figure 4:
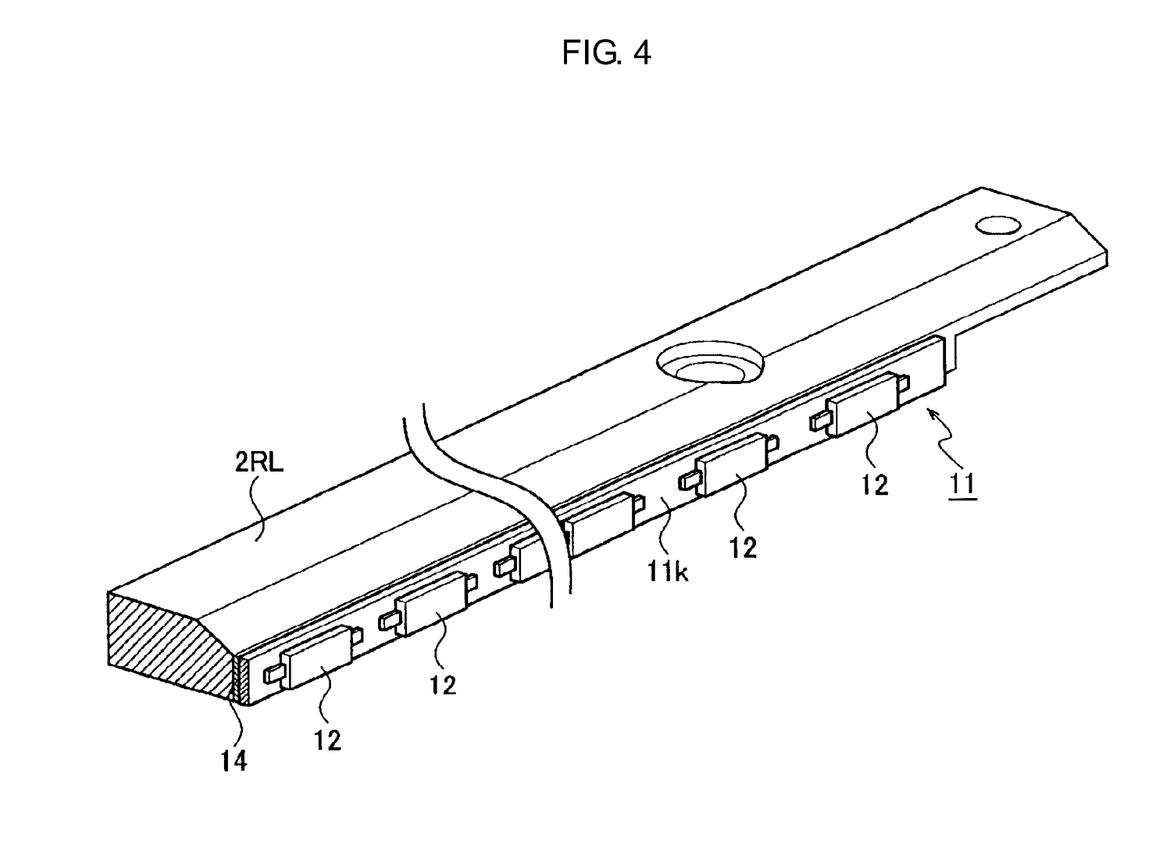
FIG. 4 is a perspective view of an adhesion structure of the LED board, showing a partial cross section thereof.

FIG. 4 is a perspective view showing a partial cross section of the LED board 11 adhered to the left rib body 2RL. As shown in FIG. 4, for example, an adhesive tape 14 having a heat-radiating property may be used to adhere the LED board 11 to each rib body.

FIG. 5 is a cross-sectional view of the top rib body 2RT of the image display device 50 according to the present invention.

The liquid crystal panel 4 is arranged on the panel chassis 7 with a buffer material 15 interposed between them. The light guide plate 8 has a slight larger size than the liquid crystal panel 4 and is a transparent plate-shaped member formed of acryl or the like. Alternatively, the light guide plate 8 which uniformly emits incident light may be formed of another material such as polycarbonate.

In order to thin the entire image display device 50, the light guide plate 8 has a thickness from about 1 mm to about 5 mm. The light guide plate 8 is arranged on a rear side of the liquid crystal panel 4 so as to cover the entire rear surface of the liquid crystal panel 4. The optical sheet unit 6 is formed by stacking a diffusion sheet, a prism sheet, or the like. The optical sheet unit 6 is disposed between the liquid crystal panel 4 and the light guide plate 8.

As described above, the LED 12 is a white light emitting diode that emits white light. In detail, the LED 12 includes a fluorescent layer which emits yellow light by being excited by blue light and is stacked on a light emitting surface of a semiconductor light emitting element that emits blue light. Accordingly, white light that is a composed light of blue light and yellow light is emitted from the LED 12. Alternatively, the LED 12 may include a first fluorescent layer emitting red light by being excited by blue light and a second fluorescent layer emitting green light by being excited by blue light, which are stacked on a light emitting surface of a semiconductor light emitting element that emits blue light. At this time, white light that is a composed light of blue, red, and green lights may be obtained as well. In order to protect the LED 12 from an external environment, the LED 12 may be sealed by a sealing material optically having a low load, for example, a synthetic resin having high transparency in a visible area.

A light mixing portion 16 is formed in a space surrounded by the LED 12, the end surface 8*a* of the light guide plate 8, the panel chassis 7, and the reflection sheet 9. The light mixing portion 16 has a function of introducing light emitted from the LED 12 to the end surface 8*a* of the light guide plate 8 while relieving unevenness of luminosity. Light emitted from the LED 12 is directly introduced to the end surface 8*a* of the light guide plate 8 through the light mixing portion 16, or introduced to the end surface 8*a* of the light guide plate 8 after being reflected at an inner surface of the panel chassis 7 or at the reflection sheet 9. The light introduced into the light guide plate 8 from the end surface 8*a* is then diffused and reflected by the reflection sheet 9 and irradiated onto a rear surface of the liquid crystal panel 4 through the optical sheet unit 6, as uniform light. Here, a process such as a dot pattern is performed on the rear surface of the light guide plate 8 so that light from the LED 12 is irradiated at an angle close to a right angle to the liquid crystal panel 4 as much as possible.

The LED 12 functions as a point light source. Accordingly, light incident on the end surface 8*a* of the light guide plate 8 may have uneven luminosity due to arrangement intervals of the LEDs 12. A distribution of light emitted by the LED 12 is known to be circular. Accordingly, when an interval H from the LED 12 to the light guide plate 8 is varied, luminosity unevenness also varies.

Generally, when the interval H from the LED 12 to the light guide plate 8 is decreased, reduction in luminosity between the LEDs increases, and thus luminosity unevenness increases. Meanwhile, when the interval H from the LED 12 to the light guide plate 8 is increased, luminosity unevenness is decreased, but an average of luminosity of light incident on the end surface 8*a* of the light guide plate 8 is decreased due to diffusion, absorption, or the like of light in the light mixing portion 16. Accordingly, the interval H is required to be set such that luminosity unevenness and an average of luminosity at the end surface 8*a* of the light guide plate 8 satisfy required values. If the LEDs 12 are all provided at equal pitches, the interval H where luminosity unevenness is minimum may be employed by varying the interval H.

Figure 6:
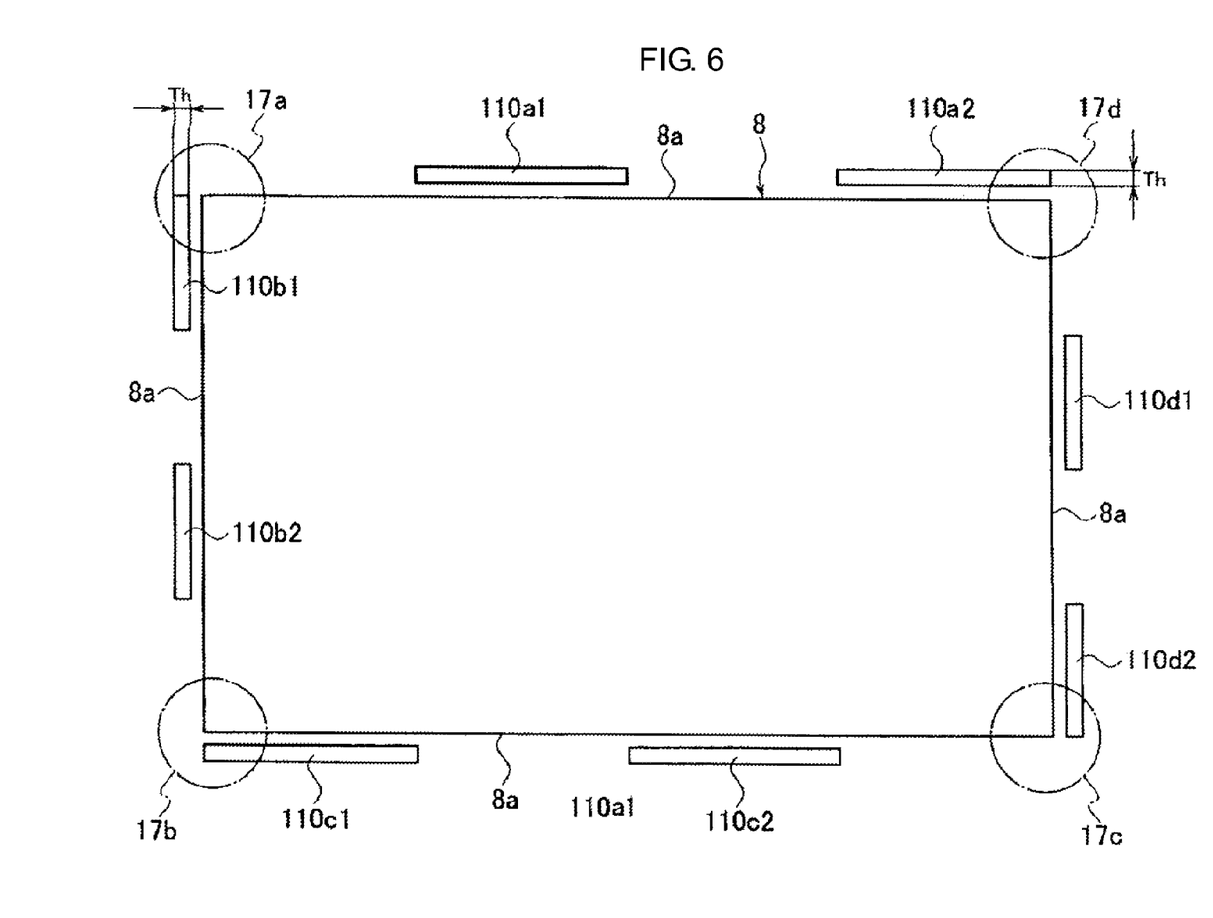
FIG. 6 is a view of an example of an arrangement configuration and an assembly method of an LED board in a backlight device inside the image display device.
Figure 7:
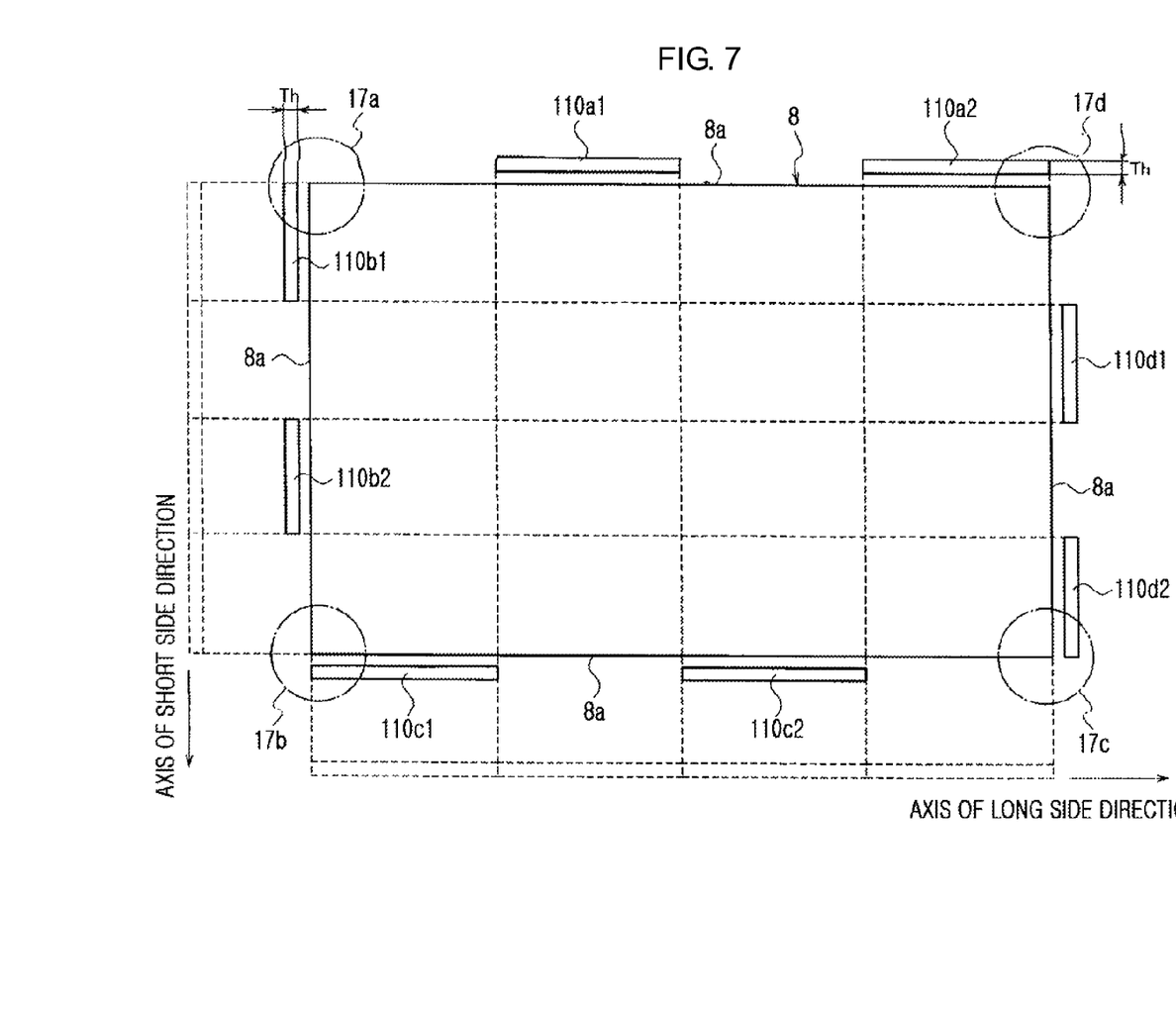
FIG. 7 is a view for describing an arrangement of the LED board of FIG. 6 for easy understanding.

FIG. 6 is a view of an example of an arrangement configuration and an assembly method of the LED board 11 in a backlight device inside the image display device 50. FIG. 7 is a view for describing an arrangement of the LED board 11 of FIG. 6 for easy understanding. For convenience of understanding, only the light guide plate 8 and the LED board 11 are shown in FIGS. 6 and 7, and other elements are not shown.

Referring to FIG. 6, LED boards 110*a*1 and 110*a*2 are arranged on the end surface 8*a* of a side surface portion of a top side of the light guide plate 8, LED boards 110*b*1 and 110*b*2 are arranged on the end surface 8*a* of a side surface portion of a left side of the light guide plate 8, LED boards 110*c*1 and 110*c*2 are arranged on the end surface 8*a* of a side surface portion of a bottom side of the light guide plate 8, and LED boards 110*d*1 and 110*d*2 are arranged on the end surface 8*a* of a side surface portion of a right side of the light guide plate 8.

Accordingly, in the device shown in FIG. 6, light of an LED light source is incident onto the light guide plate 8 from each of four sides corresponding to the end surfaces 8*a* of the top, bottom, right, and left sides of the light guide plate 8 since the LED board 11 is arranged on the four sides.

As shown in FIG. 5, thicknesses Th of the LED boards 110*a*1, 110*a*2, 110*b*1, 110*b*2, 110*c*1, 110*c*2, 110*d*1, and 110*d*2 are each equal to the sum of thicknesses of the base board 11*k* and the mounted LED 12, and are all equal.

The LED boards 110*a*1 and 110*a*2 of the top side and the LED boards 110*c*1 and 110*c*2 of the bottom sides each include a plurality of (two (2) in FIG. 6) identical boards (LED boards having standardized specification).

In other words, the LED boards 110*a*1 and 110*a*2 and the LED boards 110*c*1 and 110*c*2 have the same length in a long sides of the LED board and have the same mounting number of LEDs 12, where the LEDs 12 are arranged at equal pitches.

Also, as shown in dashed lines at the bottom of FIG. 7, the LED boards 110*a*1 and 110*a*2 of the top side and the LED boards 110*c*1 and 110*c*2 of the bottom side are alternately arranged to be misaligned on long sides facing a long side direction of the light guide plate 8, such that the LED boards 110*a*1 and 110*a*2 of the top side and the LED boards 110*c*1 and 110*c*2 of the bottom side do not overlap with respect to an axis of the long side direction of the light guide plate 8. Here, when it comes to the alternate arrangement for misalignment, it is optimal that ends of the LED boards 110*a*1 and 110*c*1 do not face each other (i.e., not opposite to each other), but parts of the ends of the LED boards 110*a*1 and 110*c*1 may face each other. Also, one or more first LED boards 110*a*1 and 110*a*2 having a long side shorter than a long side of the light guide plate 8 are arranged on a side surface of one long side of the light guide plate 8, and one or more second LED boards 110c1 and 110c2 are arranged on a side surface of the other long side of the light guide plate 8 so as not to overlap with the first LED boards 110a1 and 110a2. Hereinafter, an axis of a long side direction denotes a long side facing the end surface 8a in a long side direction of the light guide plate 8, and an axis of a short side direction denotes a short side facing the end surface 8a in a short side direction of the light guide plate 8.

Also, a sum of the length in the long sides of the LED boards 110a1 and 110a2 disposed at the top side and the length in the long sides of the LED boards 110c1 and 110c2 disposed at the bottom side is equal to the length of one long side of the light guide plate 8.

The LED boards 110b1 and 110b2 disposed at the left side and the LED boards 110d1 and 110d2 disposed at the right sides each include a plurality of (two in FIG. 6) identical boards (LED boards having standardized specification).

In other words, the LED boards 110b1 and 110b2 and the LED boards 110d1 and 110d2 have the same length in a long sides of the LED board and have the same mounting number of LEDs 12, where the LEDs 12 are arranged at equal pitches.

As shown in dashed lines at the left of FIG. 7, the LED boards 110b1 and 110b2 disposed at the left side and the LED boards 110d1 and 110d2 disposed at the right side are alternately arranged to be misaligned on short sides facing a short side direction of the light guide plate 8, such that the LED boards 110b1 and 110b2 and the LED boards 110d1 and 110d2 do not overlap with respect to an axis of the short side direction.

Also, a sum of lengths in the long sides of the LED boards 110b1 and 110b2 disposed at the left side and lengths in the long sides of the LED boards 110d1 and 110d2 disposed at the right side is equal to a length of one short side of the light guide plate 8.

Accordingly, a sum of the lengths in the long sides of the LED boards 110a1 through 110d2 in FIG. 6 is equal to a length in a case where light is introduced from total two sides of one (1) long side and one (1) short side with respect to the end surface 8a of the side surface portion of the light guide plate 8.

However, as shown in FIG. 6, since the LED boards 110a1 and 110a2 or the LED boards 110c1 and 110c2, and the LED boards 110b1 and 110b2 or the LED boards 110d1 and 110d2 do not have the same specification, lengths in the long sides of the LED boards 110a1 and 110a2 or the LED boards 110c1 and 110c2, and lengths in the long sides of the LED boards 110b1 and 110b2 or the LED boards 110d1 and 110d2 are different to each other.

In other words, in the embodiment shown in FIG. 6, the LED boards 11 are arranged by being standardized into boards having two types of specifications.

Accordingly, during manufacture and assembly, the mounting of the LED 12 on each LED board 11 or installing of the LED board 11 to the backlight device may be easily performed via standardization, and at the same time, expenses for the LED board 11 or LED driver and heat radiation countermeasure may be reduced.

Also, in the example of FIG. 6, two LED boards 11 are arranged each on the top and bottom long sides and right and left short sides, but the number of LED boards 11 is not limited thereto.

A pitch arrangement is standardized by arranging the LEDs 12 at equal pitches on the LED boards 11 having specifications standardized respectively for the top and bottom long sides and right and left short sides, but the arrangement of LEDs 12 is not limited thereto, and for example, pitch widths of the LEDs 12 may vary according to standardized board or the LEDs 12 may be arranged at irregular pitches.

In FIG. 6, the lengths of LED boards 110a1, 110a2 (or LED boards 110c1, 110c2) are longer than the lengths of LED boards 110b1, 110b2 (or LED boards 110d1, 110d2), but the lengths of LED boards 110a1, 110a2 may be shorter than the lengths of LED boards 110b1, 110b2.

In the present embodiment, only one of the LED board 11 in the long side direction and the LED board 11 in the short side direction is arranged at each of edge portions of four corners of the light guide plate 8.

In detail, the LED board 110b1 of the short side is arranged at a left top edge portion 17a, the LED board 110c1 of the long side is arranged at a left bottom edge portion 17b, the LED board 110d2 of the short side is arranged at a right bottom edge portion 17c, and the LED board 110a2 of the long side is arranged at a right top edge portion 17d.

However, the arrangement of the LED boards 11 is not limited to the example of FIG. 6, and for example, the LED board 110a1 of the long side may be arranged at the left top edge portion 17a, instead of the LED board 110b1 of the short side.

As such, by arranging the LED boards 11 on the end surface 8a of the four side surface portions of the light guide plate 8, a heat source is dispersed throughout the four sides without heat quantity due to an LED light source being concentrated on a part of the four sides. Accordingly, a temperature at an edge portion outside an image display surface of a body of an image display device may be suppressed from being increased, while uniformizing the temperature at the edge portion.

Also, since heat quantity is not concentrated on four corners of a backlight, i.e., the edge portions 17a through 17d of the four corners of the light guide plate 8, driving efficiency of an LED may be prevented from being deteriorated due to heat concentration.

Accordingly, since deterioration of an LED due to a change with the passage of time at a local spot may be suppressed, a change of an LED light source with the passage of time is uniformized in overall while driving efficiency of the LED is satisfactory in overall. Thus, energy of the backlight device or image display device 50 may be saved while improving a product lifetime.

Figure 8:
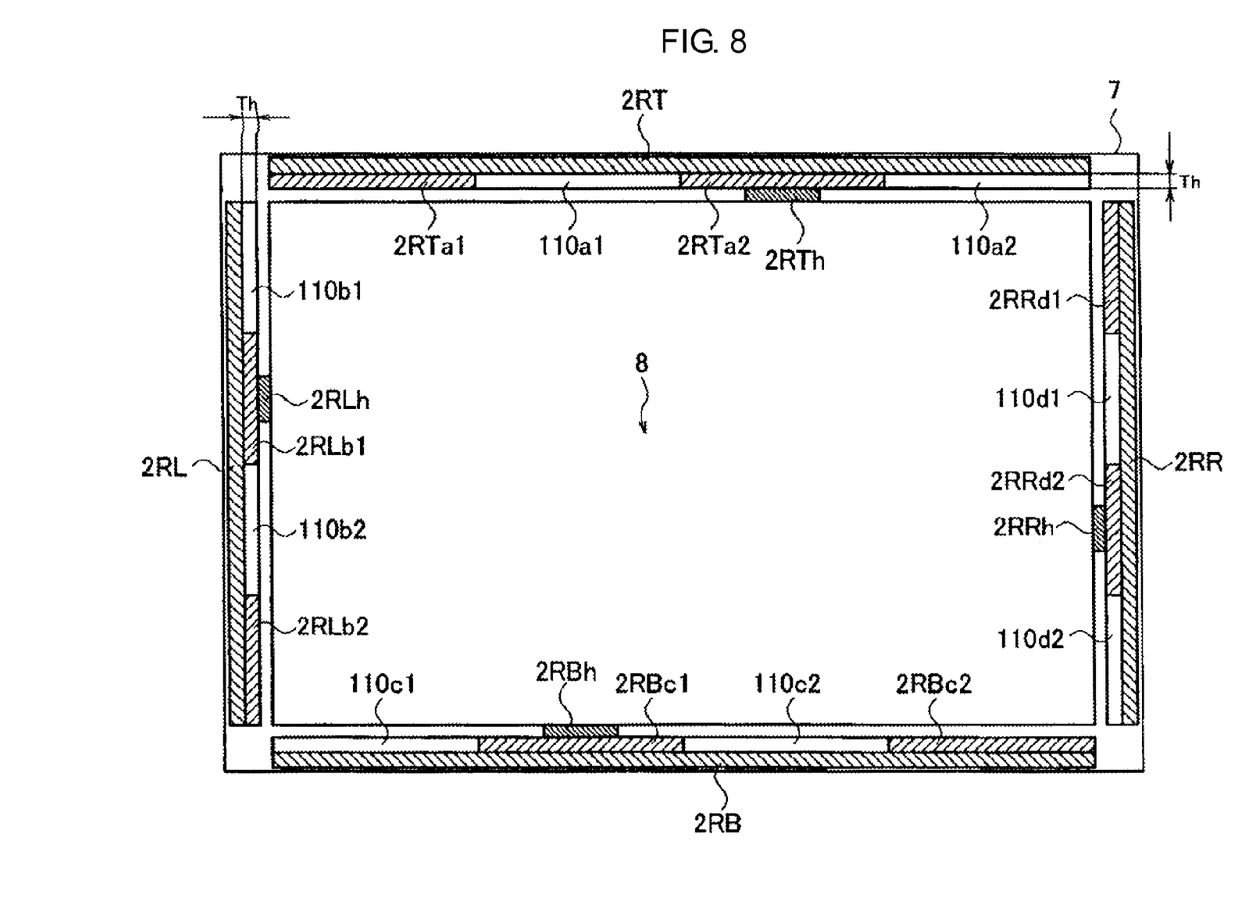
FIG. 8 is a configuration view of an example of essential parts of a backlight in the image display device.

FIG. 8 is a configuration view showing an example of essential parts of a backlight in the image display device 50. For convenience of explanation, FIG. 8 only shows an outer frame of the panel chassis 7.

In FIG. 8, since an LED board arranged on the end surface 8a of the side surface portion of the light guide plate 8 is identical to the LED board 11 of FIG. 6, the same reference numerals are denoted for the same portions as in FIG. 6 and major descriptions about the LED board 11 are be suitably omitted.

Although omitted for convenience in the description of FIG. 6, the LED board 11 is adhered to the top, left, bottom, and right rib bodies 2RT, 2RL, 2RB, and 2RR by using the adhesive tape 14.

In FIG. 8, the LED boards 110a1 and 110a2 are adhered to the top rib body 2RT, the LED boards 110b1 and 110b2 are adhered to the left rib body 2RL, the LED boards 110c1 and 110c2 are adhered to the bottom rib body 2RB, and the LED boards 110d1 and 110d2 are adhered to the right rib body 2RR.

Also, an additional heat radiating unit (heat radiator) is included in an end surface area of the end surface 8a of the side surface portion of the light guide plate 8, where the LED board 11 is not arranged. The additional heat radiating unit radiates heat of an LED light source by being adhered to a rib body described later.

Top rib body additional heat radiating units 2RTa1 and 2RTa2 are adhered to the top rib body 2RT, left rib body additional heat radiating units 2RLb1 and 2RLb2 are adhered to the left rib body 2RL, bottom rib body additional heat radiating units 2RBc1 and 2RBc2 are adhered to the bottom rib bodies 2RB, and right rib body additional heat radiating units 2RRd1 and 2RRd2 are adhered to the right rib body 2RR. A thickness of each additional heat radiating unit is equal to the thickness Th of LED board 110a1 through 110d2.

Also, in the example of FIG. 8, an additional heat radiating unit adhered to a rib body is an individual unit, but alternatively, an additional heat radiating unit and a rib body may be integrally formed or an additional heat radiating unit, an LED board, and a rib body may be integrally formed.

A holding unit (holder) may be provided in a gap between an additional heat radiating unit and the light guide plate 8. The holding unit may fix a location of the light guide plate 8 and uniformly maintain a distance between the light guide plate 8 and the LED 12.

Here, the holding unit includes a heat-insulating structure so that heat is not transferred to the light guide plate 8.

In the example of FIG. 8, the top rib body additional heat radiating unit 2RTa2 is adhered to a holding unit 2RTh, the left rib body additional heat radiating unit 2RLb1 is adhered to a holding unit 2RLh, the bottom rib body additional heat radiating unit 2RBc1 is adhered to a holding unit 2RBh, and the right rib body additional heat radiating unit 2RRd2 is adhered to a holding unit 2RRh.

However, a location of a holding unit adhered to an additional heat radiating unit is not limited thereto, and the holding unit may be adhered to an additional heat radiating unit disposed at a different location.

As described above, by arranging the LED boards 11 on the end surfaces 8a of four side surface portions of light guide plate 8 while alternately arranging the LED boards 11 to be misaligned on facing long sides or short sides with respect to the axis of long side direction or short side direction of the light guide plate 8, heat quantity due to a light source is not concentrated on a part of sides, a heat source is distributed throughout the four sides, and areas of the LED boards 11 contacting the top, bottom, left, and right rib bodies 2RT, 2RB, 2RL, and 2RR are reduced, and thus heat radiation effects of the top, bottom, left, and right rib bodies 2RT, 2RB, 2RL, and 2RR are increased and the temperature at the edge portion outside the image display surface can be suppressed from being increased.

Also, by disposing an additional heat radiating unit in an area of the end surface 8a of the light guide plate 8, where the LED board 11 is not arranged, i.e., an area between the LED boards 11, a heat radiation effect of entire rib bodies is further improved, and the temperature at the edge portion may be maintained low and uniformly.

Accordingly, since it is possible to decrease a size of the outer frame of the panel chassis 7, the edge of backlight may be narrowed. Also, since it is possible to decrease heat radiation capacity in an inner length direction of the backlight, the backlight may be thinned while reducing expenses due to a heat radiation countermeasure as much as possible.

By applying the present embodiment described above, the image display device 50, and a method of assembling the backlight device, where thinning or edge-narrowing of the body of image display device 50 is realized, can be provided.

Figure 9:
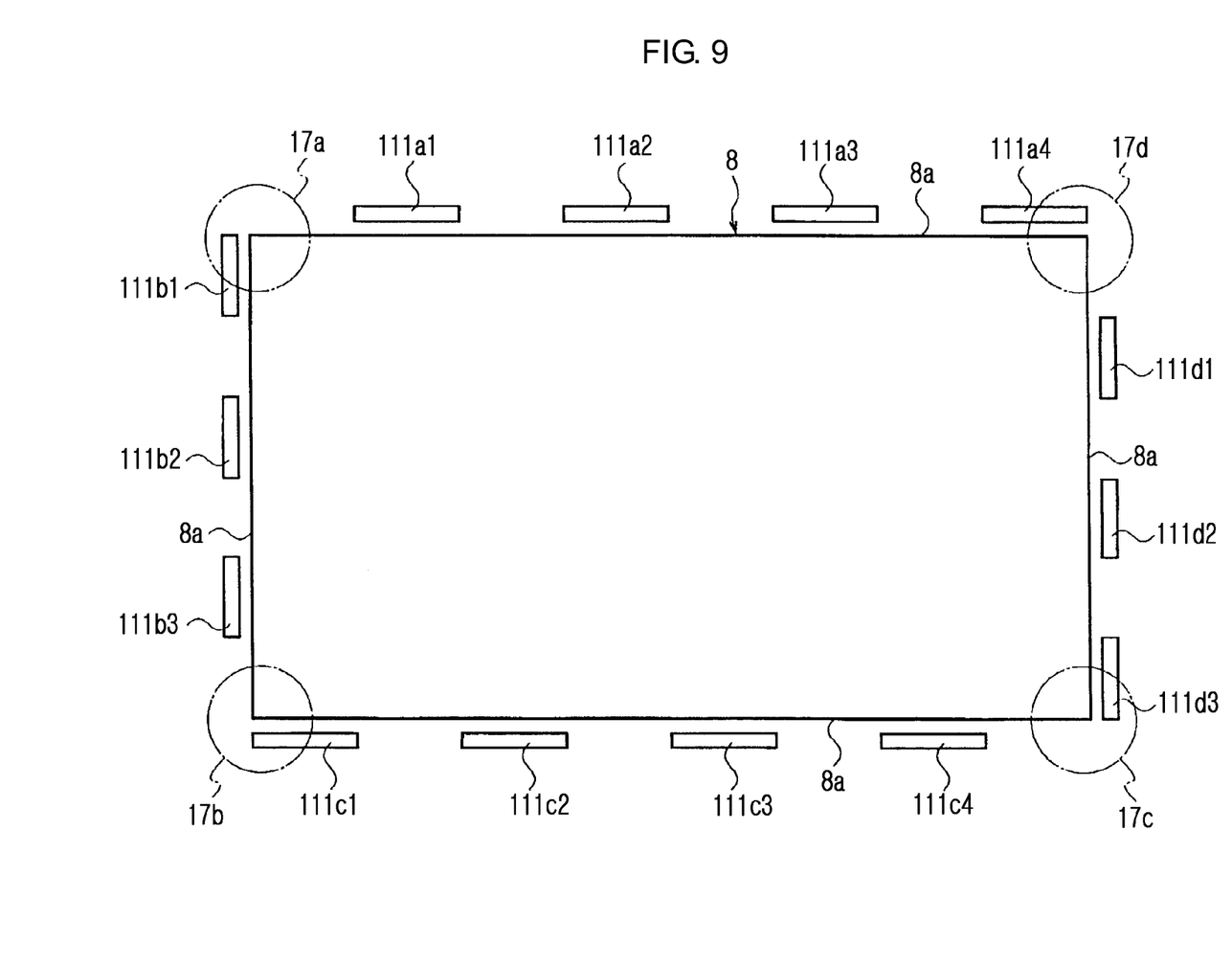
FIG. 9 is a view of an example of another arrangement configuration and another assembly method of an LED board in a backlight device inside the image display device.
Figure 10:
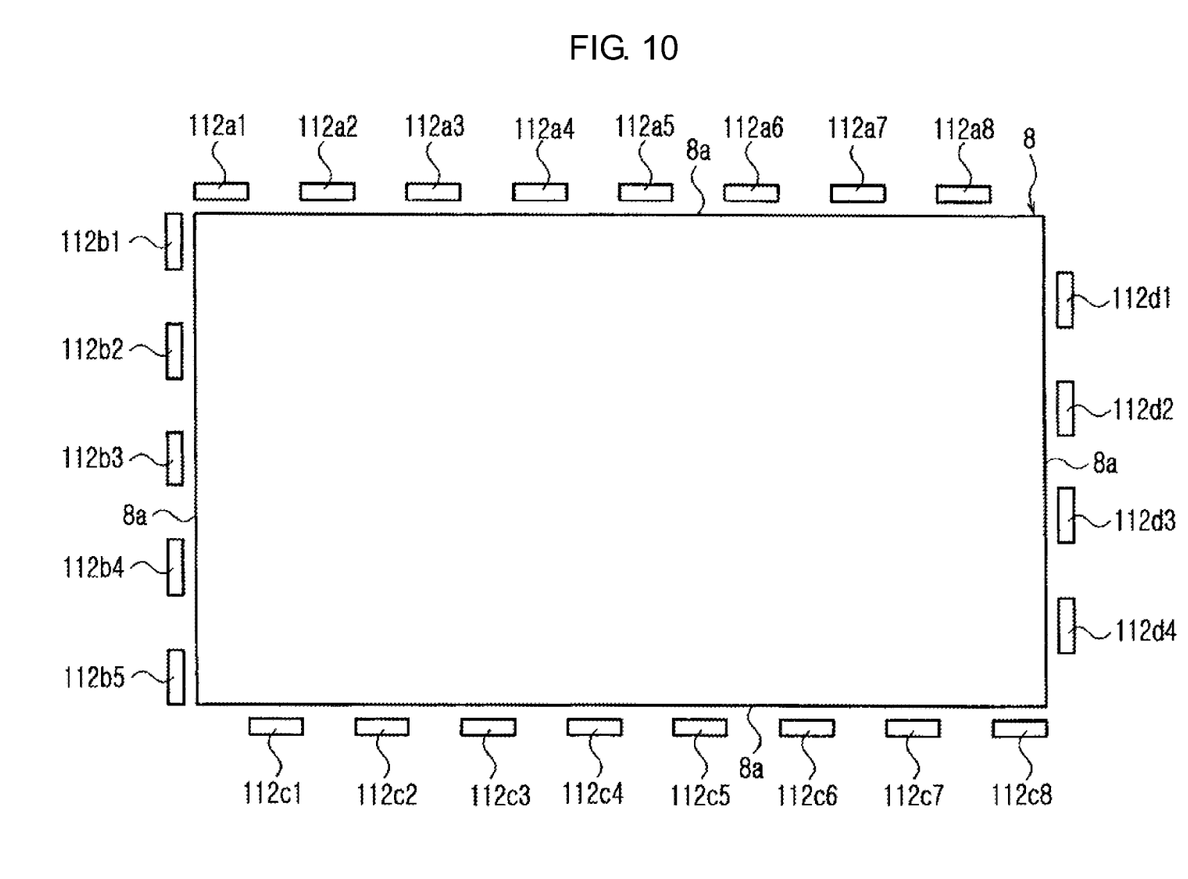
FIG. 10 is a view of an example of yet another arrangement configuration and another assembly method of an LED board in a backlight device inside the image display device.

FIGS. 9 and 10 are views of examples of other arrangement configurations and other assembly methods of the LED board 11 in the backlight device inside the image display device 50.

In FIG. 9, the numbers of LED boards 11 arranged on the long side and the short side are different, where the numbers of LED boards 11 arranged on top and bottom long sides are each four and the numbers of LED boards 11 arranged on left and right short sides are each three (3).

In the example of FIG. 6 or 8, numbers of LED boards arranged on a long side and a short side are the same, but numbers of LED boards arranged on each side may suitably vary according to lengths of long and short sides when the lengths of the long and short sides are different as shown in the example of FIG. 9.

Like the example of FIG. 6, a plurality of (four each in FIG. 9) same boards (LED boards having standardized specifications) are arranged as LED boards 111a1, 111a2, 111a3, and 111a4 of a top side and LED boards 111c1, 111c2, 111c3, and 111c4 of a bottom side in the example of FIG. 9.

In other words, lengths of the LED boards 111a1 through 111a4 and the LED boards 111c1 through 111c4 in a long side direction are the same, and numbers of LEDs 12 mounted on the LED boards 111a1 through 111a4 and 111c1 through 111c4 are the same, and the LEDs 12 are arranged at equal pitches.

Also, the LED boards 11 are alternately arranged to be misaligned on long sides facing the long side direction of the light guide plate 8 in a long side direction so as not to overlap with respect to an axis of the long side direction.

Also, a sum of the lengths of the LED boards 111a1 through 111a4 of the top side in the long side direction and the lengths of the LED boards 111c1 through 111c4 of the bottom side in the long side direction is equal to a length of one (1) long side of the light guide plate 8.

Also, a plurality of (three (3) each in FIG. 9) same boards (LED boards having standardized specifications) are arranged as LED boards 111b1, 111b2 and 111b3 of a left side and LED boards 111d1, 111d2, and 111d3 of a right side.

In other words, lengths of the long side of the LED boards 111b1 through 111b3 and lengths of the long side of the LED boards 111d1 through 111d3 are the same, and numbers of LEDs 12 mounted on the LED boards 111b1 through 111b3 and 111d1 through 111d3 are the same, and the LEDs 12 are arranged at equal pitches.

Also, the LED boards are alternately arranged to be misaligned on short sides facing the short side direction of the light guide plate 8 so as not to overlap with respect to an axis of the short side direction.

Also, a sum of the lengths of the long side of the LED boards 111b1 through 111b3 of the left side and the lengths of the long side of the LED boards 111d1 through 111d3 of the right side is equal to a length of one short side of the light guide plate 8.

Accordingly, a sum of the lengths of the LED boards in FIG. 9 is equal to a sum of the lengths of one long side and one short side of the end surface 8a of the side surface portion of the light guide plate 8.

However, as shown in FIG. 9, since the LED board 111a or LED board 111c and the LED board 111b or LED board 111d do not have the same specification, the lengths in the long sides of the LED boards 111a1 through 111a4 or LED board 111c1 through 111c4 and the lengths in the long sides of the LED boards 111b1 through 111b3 or LED board 111d1 through 111d3 are different from each other In other words, in the embodiment of FIG. 9, the LED boards 11 are arranged by being standardized into base boards having two types of specifications.

Accordingly, during manufacture and assembly, mounting of an LED on each LED board or installing of an LED board to a backlight device may be easily performed via standardization, and at the same time, expenses for the LED board or LED driver and heat radiation countermeasure may be reduced.

Like the example of FIG. 6, only one of an LED board in a long side direction and an LED board in a short side direction is arranged at each of the edge portions 17a through 17d of the four corners of the light guide plate 8 in the example of FIG. 9.

In detail, the LED board 111b1 of the short side is arranged at the left top edge portion 17a, the LED board 111c1 of the long side is arranged at the left bottom edge portion 17b, the LED board 111d3 of the short side is arranged at the right bottom edge portion 17c, and the LED board 111a4 of the long side is arranged at the right top edge portion 17d.

In addition, a pitch arrangement is standardized by arranging the LEDs 12 at equal pitches on the LED boards 11 having specifications standardized respectively for the top and bottom long sides and right and left short sides, but the arrangement of LEDs 12 is not limited thereto, and for example, pitch widths of the LEDs 12 may vary according to standardized board or the LEDs 12 may be arranged at irregular pitches.

As such, by arranging LED boards on the end surface 8a of the four side surface portions of the light guide plate 8, a heat source is dispersed throughout the four sides without heat quantity due to an LED light source being concentrated on a part of the four sides. Accordingly, a temperature at an edge portion outside an image display surface of a body of an image display device may be suppressed from being increased, while uniformizing the temperature at the edge portion.

Also, since heat quantity is not concentrated at four corners of a backlight, i.e., edge portions of four corners of a light guide plate, driving efficiency of an LED may be prevented from being deteriorated due to heat concentration.

Accordingly, since deterioration of the LED 12 due to a change with the passage of time at a local spot may be suppressed, a change of an LED light source with the passage of time is uniformized in overall while driving efficiency of the LED 12 is satisfactory in overall. Thus, energy of the backlight device or image display device 50 may be saved while improving a product lifetime.

In FIG. 10, lengths La in the long sides of the LED board 11 are the same by using the same board (boards standardized to one type of specification) for all of the LED boards 11 arranged on the top and bottom long sides of the light guide plate 8 and the LED boards 11 arranged on the right and left short sides of the light guide plate 8, and the LED boards 11 are arranged on the end surfaces 8a of the light guide plate 8.

FIG. 10 shows an example of the light guide plate 8 having an aspect ratio of 16:9, where the number of LED boards 11 arranged on the top and bottom long sides is sixteen (16) and the number of LED boards 11 arranged on the right and left short sides is nine (9).

As such, by arranging the LED boards 11 on the end surfaces 8a of the light guide plate 8 by standardizing the lengths of the long sides of the LED boards 11 to be the same, efficiency of mounting or installing of an LED light source to each LED board 11 may be increased and the LED boards 11 may be efficiently arranged on the end surfaces 8a of the light guide plate 8 during manufacture and assembly. Thus, design efficiency of the LED board 11 or LED driver is improved, thereby realizing expense reduction of the LED board 11 or LED driver.

Also, in the LED boards 11 of the top and bottom long sides and left and right short sides standardized to the same specification, the pitch arrangements are standardized by arranging the LEDs 12 at equal pitches, but the present invention is not limited thereto and for example, the LED boards 11 may be standardized by arranging the LEDs 12 at irregular pitches.

By applying the same heat-radiating structure shown in FIG. 8 to the example of FIG. 9 or 10, thinning or edge-narrowing of the backlight device may be realized and at the same time, it is possible to suppress expenses due to a heat radiation countermeasure of the backlight device or image display device as much as possible.

By applying the present embodiment described above, it is possible to provide the backlight device, the image display device 50, and the method of assembling the backlight device, where the thinning or edge-narrowing of the body of the image display device is realized.

Also in the present embodiment, a light source is a white LED, but is not limited thereto, and for example, a single color LED of one of RGB may be arranged.

According to the backlight device and image display device of the present invention, it is possible to reduce expenses for LED boards or LED drivers and heat radiation countermeasure, etc., since it is possible to standardize specifications of the LED boards or LED drivers by arranging the LED boards which are arranged on the long sides facing the end surfaces of the long side direction of the light guide plate and have the same lengths in the long sides of the LED board and the LED boards which are arranged on the short sides facing the end surfaces of the short side direction of the light guide plate and have the same lengths in the long sides of the LED board, or by arranging the LED boards on the end surfaces of the light guide plate by standardizing the lengths of the long sides of the LED boards to be the same.

Also, the LED boards are arranged along the end surfaces of four sides of the light guide plate while alternately arranging the LED boards to be misaligned on the long sides facing the long side direction of the light guide plate so as not to overlap with respect to the axis of the long side direction and alternately arranging the LED boards to be misaligned on the short sides facing the short side direction of the light guide plate so as not to overlap with respect to the axis of the short side direction. Accordingly, the heat source is dispersed throughout the four sides without the heat quantity due to the light source being concentrated at a part of the four sides, and thus the temperature at the edge portions outside the image display surface of the body of the image display device can be suppressed from being increased while the temperatures at the edge portions are uniformized.

Also, since only one of the LED board in the long side direction and the LED board in the short side direction is arranged at the four corners of the backlight, i.e., the edge portions of the four corners of the light guide plate, the light quantity is not concentrated at the four corners of the light guide plate and thus deterioration of driving efficiency of the LEDs due to heat concentration can be suppressed. Accordingly, the change of LED light sources with the passage of time can be uniformized throughout the backlight, and thus a product lifetime of the backlight device or image display device can be increased compared to a conventional product lifetime.

Further, the heat radiating unit is provided in the area of the end surface of the light guide plate, where the LED board is not arranged, i.e., in the area corresponding to the gap between the LED boards, and thus the backlight device and the image display device, where the thinning or edge-narrowing of the body of the image display device is realized, can be provided.

In addition, according to the method of assembling the backlight device of the present invention, the LED boards standardized according to each side of the light guide plate are arranged along the end surfaces of the four sides of the light guide plate, or the LED boards standardized to have the same lengths in the long sides of the LED board are arranged along the end surfaces of the four sides of the light guide plate, where the LED boards are alternately arranged to be misaligned on the long sides facing the light guide plate in the long side direction so as not to overlap with respect to the axis of the long side direction and LED boards are alternately arranged to be misaligned on the short sides facing the light guide plate in the short side direction so as not to overlap with respect to the axis of the short side direction. Accordingly, during manufacture and assembly, the mounting of LEDs on each LED board or installing of the LED board to the backlight device can be easily performed via standardization and expenses for the LED board or LED driver and the heat radiation countermeasure can be reduced. Further, since the heat source is dispersed throughout the four sides without the heat quantity due to the light source being concentrated at the part of the four sides, the temperatures at the edge portions outside the image display surface of the body of the image display device can be suppressed from being increased while the temperatures at the edge portions can be uniformized.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A backlight device comprising:
    a light guide plate; and
    LED boards which are arranged facing end surfaces of side surface portions of the light guide plate and on which LEDs introducing light to the light guide plate are mounted,
    wherein lengths of long sides of the LED boards arranged on long sides facing end surfaces in a long side direction of the light guide plate are the same, and lengths of long sides of the LED boards arranged on short sides facing end surfaces in a short side direction of the light guide plate are the same, and
    the LED boards are arranged along the end surfaces of each of 4 sides of the light guide plate, the LED boards are alternately arranged to be misaligned on the long sides facing the end surfaces in a long side direction of the light guide plate such as not to overlap with respect to an axis of the long side direction of the light guide plate, and the LED boards are alternately arranged to be misaligned on the short sides facing the end surfaces in the short side direction of the light guide plate such as not to overlap with respect to an axis of the short side direction of the light guide plate.

2. The backlight device of claim 1,
    wherein the lengths of long sides of the LED boards arranged on long sides facing the end surfaces in the long side direction of the light guide plate and the lengths of long sides of the LED boards arranged on short sides facing the end surfaces in the short side direction of the light guide plate are all the same.

3. The backlight device of claim 1, wherein any one of the LED boards in the long side direction and the LED boards in the short side direction is arranged at each of edge portions of four corners of the light guide plate.

4. The backlight device of claim 1, comprising a heat radiator provided in an area of the end surface where the LED board is not arranged.

5. A backlight device comprising:
    a light guide plate;
    LED boards which are arranged facing end surfaces of side surface portions of the light guide plate and on which LEDs introducing light to the light guide plate are mounted;
    a heat radiator provided in an area of the end surface where the LED board is not arranged; and
    a holder having a heat-insulating structure in a gap between the heat radiator and the light guide plate,
    wherein lengths of long sides of the LED boards arranged on long sides facing end surfaces in a long side direction of the light guide plate are the same, and lengths of long sides of the LED boards arranged on short sides facing end surfaces in a short side direction of the light guide plate are the same.

6. An image display device comprising:
    the backlight device of claim 1; and
    a display module having a display surface which displays an image.

7. A method of assembling a backlight device comprising a light guide plate and LED boards which are arranged facing end surfaces of side surface portions of the light guide plate and on which LEDs introducing light to the light guide plate are mounted,
    wherein lengths of long sides of the LED boards arranged on long sides facing end surfaces in a long side direction of the light guide plate are the same, and lengths of long sides of the LED boards arranged on short sides facing end surfaces in a short side direction of the light guide plate are the same, and
    the LED boards standardized according to each side of the light guide plate are respectively arranged along the end surfaces of 4 sides of the light guide plate, the standardized LED boards are alternately arranged to be misaligned on the long sides facing the end surfaces in the long side direction of the light guide plate such as not to overlap with respect to an axis of the long side direction of the light guide plate, and the standardized LED boards are alternately arranged to be misaligned on the short sides facing the end surfaces in the short side direction of the light guide plate such as not to overlap with respect to an axis of the short side direction of the light guide plate.

* * * * *